D. B. FULLER.
Machines for Making Cakes.

No. 147,000.

4 Sheets--Sheet 1.

Patented Feb. 3, 1874.

D. B. FULLER.
Machines for Making Cakes.
No. 147,000. Patented Feb. 3, 1874.

4 Sheets--Sheet 2.

D. B. FULLER.
Machines for Making Cakes.

No. 147,000.

4 Sheets--Sheet 3.

Patented Feb. 3, 1874.

Witnesses.

Inventor.

4 Sheets--Sheet 4.
D. B. FULLER.
Machines for Making Cakes.
No. 147,000. Patented Feb. 3, 1874.
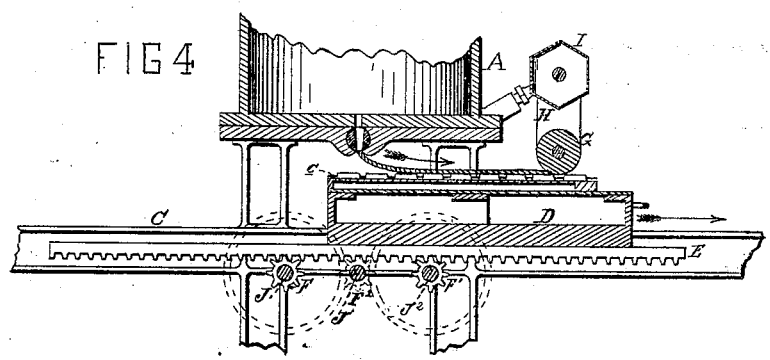
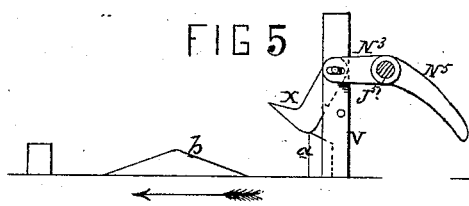
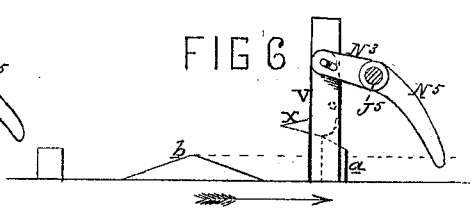
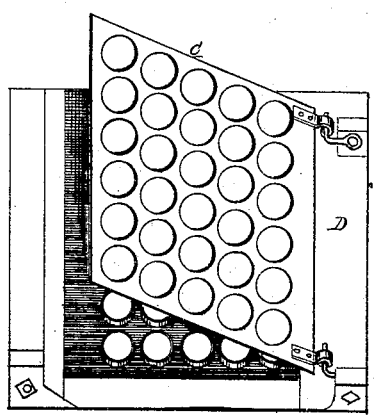
Witnesses. Inventor.

UNITED STATES PATENT OFFICE.

DWIGHT B. FULLER, OF PHILADELPHIA, PENNSYLVANIA.

IMPROVEMENT IN MACHINES FOR MAKING CAKES.

Specification forming part of Letters Patent No. 147,060, dated February 3, 1874; application filed June 23, 1873.

*To all whom it may concern:*

Be it known that I, DWIGHT B. FULLER, of the city and county of Philadelphia, State of Pennsylvania, have invented certain Improvements in Machines for Making Cakes, of which the following is a specification:

The object of my invention is to construct a machine for making cakes that will operate automatically, thereby requiring less labor, and greatly facilitate the manufacture of cakes. It consists of a carriage or platen, provided with a series of cake-cutting dies, arranged on a suitable frame, and moved forward and backward, by means of a rack and pinions, beneath a cylindrical vessel, in which dough is placed. This vessel or receiver is provided at the bottom with a longitudinal slot, as described in my patent of March 12, 1872, through which the dough is forced. The sheet, passing onto the carriage, is conveyed beneath a pressure-roller, which cuts the cakes, and at the same time imparts a rotary movement to a flour-sifting box above the roller. The movements of the carriage and the opening and closing of the slot in the cylinder are controlled by means of suitable mechanism connected with the machine.

Figure 1:
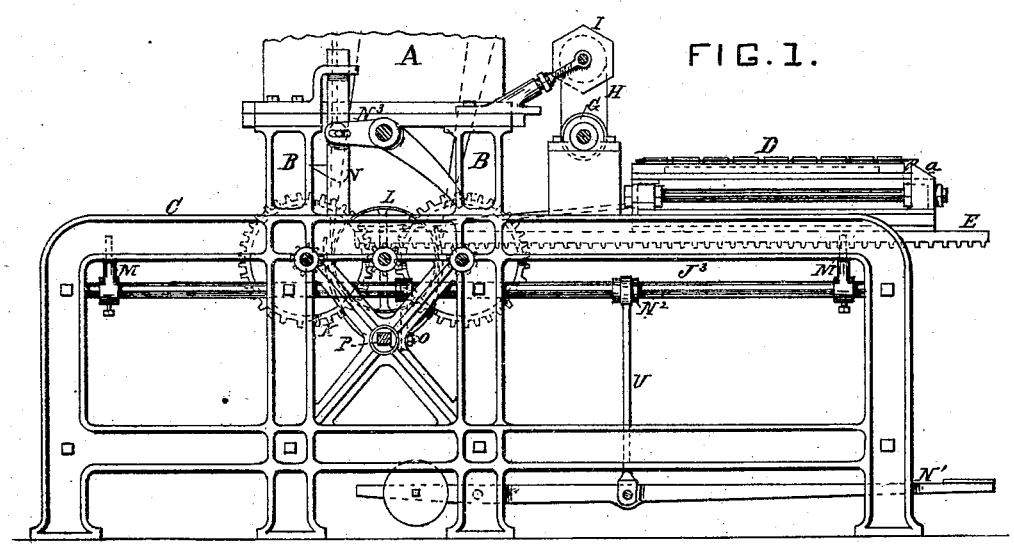
Figure 2:
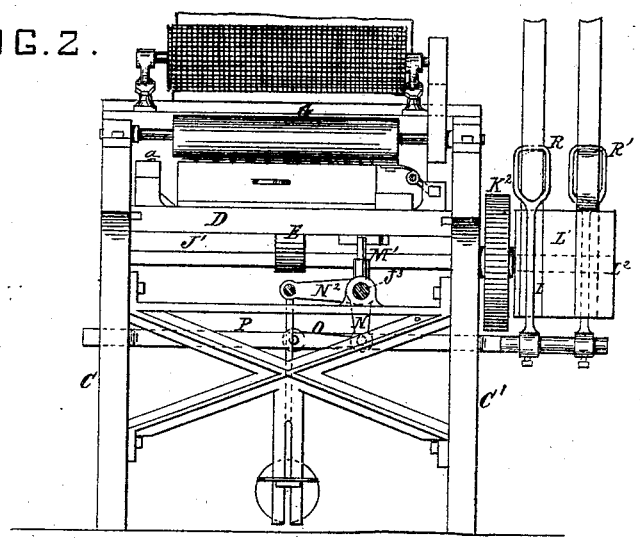
Figure 3:
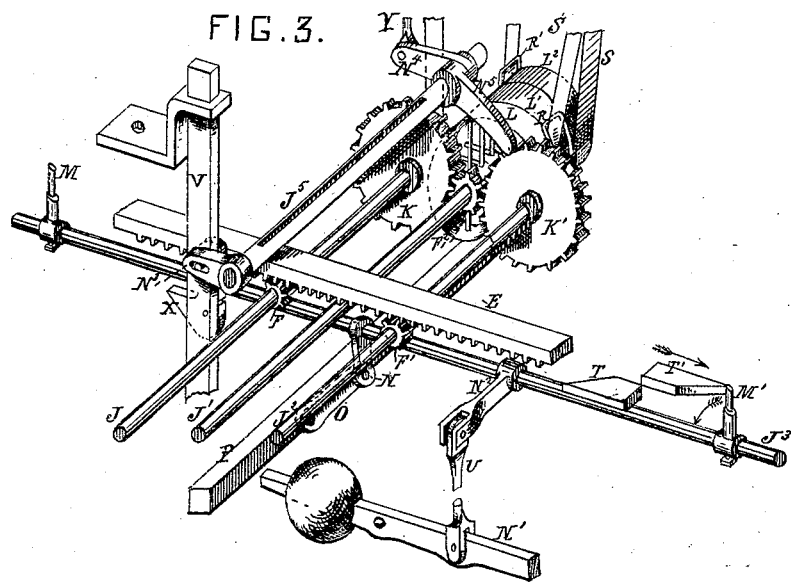

Figure 1 is a side elevation of my improvement in machines for making cakes. Fig. 2 is a front elevation of the same. Fig. 3 is a perspective view of the working parts. Fig. 4 is a vertical section of a portion of the machine. Figs. 5 and 6 are detached views of the devices for opening and closing the slot in the cylinder. Fig. 7 is a perspective view of a scrap-plate used in connection with the cutting-dies.

The cylindrical vessel A, in which the dough is placed, is arranged as described in my patent of March 12, 1872, and is mounted the proper height upon feet B B B B, which rise above the frame C and C'. The carriage or platen D, containing the cake-cutters, is fitted to guide bars or ways formed on the inner sides of the said frame, and is moved forward and backward beneath the dough-receiver A by means of the toothed rack E, which gears with two pinions, F and $F^1$, similar to the platen of a planing-machine. Arranged transversely with the frame C and C', and below the vessel A, are three shafts, J, $J^1$, and $J^2$, Figs. 1, 2, and 3, on two of which are placed the pinions F and $F^1$, which mesh with the teeth of the rack E. The shafts J and $J^2$ are also provided with toothed wheels K and K', which gear with a pinion, $F^2$, on the central shaft, $J^1$. The said shaft $J^1$ is furnished with three pulleys, L, $L^1$, and $L^2$, one of which, $L^1$, is fast upon and rotates the shaft, while the other two revolve independent of it. The mechanism for shifting the driving-belts, to produce a forward or retrograde movement of the platen, consists of a shaft, $J^3$, which extends parallel with the framing of the machine, and is supported in suitable bearings formed on the cross-bars at each end of the same. The said shaft is provided, near each end, with a dog, M and M', and in the center with a lever, N, which is attached, by means of the link O, to a sliding bar, P. This bar passes under the pulley, and is furnished with two belt-carriers, R and R'. Motion is transmitted to the shaft $J^1$ by means of the belt S or S', and is communicated to the shafts J and $J^2$ through the pinion $F^2$ and gear-wheels K and K'. The pulley $L^2$, over which the open belt S passes, rotates the shaft $J^2$, to propel the carriage at a slow rate of speed while receiving the sheet of dough, and while the cakes are being cut; and the cross-belt S', which leads from a larger pulley overhead, rotates the shaft $J^1$, when shifted on the pulley $L^1$, in an opposite direction, and propels the carriage backward at an increased rate of speed toward the cylinder A. The movement of the carriage D in either direction is controlled by means of wedge-blocks T and T, secured to the under side of it, which are brought alternately in contact with the dogs M and M'; and, in pressing against either one, they cause a partial rotary or oscillating movement of the shaft $J^3$, and a corresponding movement of the lever N, which, in turn, operates the shifting-bar P and belt-carriers R and R'. A treadle, N, to start the machine, is arranged at the lower part of the framing, and connects with the shaft $J^3$ through a rod, U, and arm $N^2$. By pressing on the said treadle the shaft $J^3$ is oscillated sufficiently to shift the belt S or S' onto the pulley which revolves the driving-shaft $J^1$. The slotted shaft $J^5$, which is arranged in the bottom of the vessel A to regulate the thickness and cut off the sheets of dough, is provided on one end with an arm, $N^3$, and at the opposite extremity with a curved arm, $N^5$, Figs. 5 and 6. The arm $N^3$ connects with a vertical-moving guide-bar, V, to the back of which is pivoted a latch, X. A vertical projection, $a$, on one side of the carriage D, passes underneath this latch when the carriage is moving toward the front of the machine, as shown in Fig. 6, and raises the guide-bar, carrying the projecting end of the arm $N^3$, upward sufficiently to rotate the slotted shaft and open the slot in the cylinder to permit a sheet of dough to pass through. The curved arm $N^5$ is by this operation depressed, and when the carriage is making the backward movement an incline projection, $b$, on the carriage passes underneath the dependent end, and, by raising the arm, turns the shaft $J^5$ sufficiently to close the opening in the cylinder. When the carriage is making the backward movement, the projection $a$ strikes the latch X, and releases it from the stop on the guide-bar V without moving the bar or arm $N^3$. After a sheet of dough has been deposited on the cake-cutting dies, the carriage passes beneath a roller, G, as shown in Fig. 4, which presses upon the dough sufficient to cut the cakes, and at the same time the rectilinear motion of the carriage communicates a rotary movement to the roller, which motion is transmitted, through the belt H, to a flour-distributing box, I, immediately above it (the roller.)

What I claim as my invention is—

1. The combination of the carriage D, provided with the rack E, pinions F and $F^1$, and shafts J and $J^2$, all adapted to operate substantially in the manner and for the purpose herein shown and described.

2. The combination of the shafts J, $J^1$, and $J^2$, gear-wheels K and K', pinion $F^2$, and pulleys L, $L^1$, and $L^2$, arranged and operating substantially as herein shown and described.

3. The combination of the shaft $J^3$, provided with the dogs M and M', lever N, and link O, with the shifting-bar P, provided with the belt-carriers R and R', arranged and operating substantially as herein shown and described.

4. The combination of the treadle $N^1$, rod U, shaft $J^3$, arms N and $N^2$, link O, and shifting-bar P, arranged and operating substantially as herein shown and described.

5. In combination with the dogs M and M' on the shaft $J^3$, the wedge-blocks T and T, attached to the carriage D, substantially as herein shown and described.

6. In combination with the slotted shaft $J^5$, arm $N^3$, guide-bar V, and latch X, the vertical projection $a$, arranged on the carriage D, as herein shown and described.

7. In combination with the slotted shaft $J^5$, provided with the arm $N^5$, the inclined projection $b$, arranged on the carriage D, as herein shown and described.

8. In combination with the sliding carriage and its cake-cutting dies, the pressure-roller G and rotating flour-sifting box I, arranged and operating substantially as herein shown and described.

DWIGHT B. FULLER.

Witnesses:
JNO. A. BELL,
ISAAC R. OAKFORD.